US011255203B2

(12) United States Patent
Eberling-Fux et al.

(10) Patent No.: US 11,255,203 B2
(45) Date of Patent: Feb. 22, 2022

(54) METHOD FOR INJECTING A LOADED SLURRY INTO A FIBROUS TEXTURE

(71) Applicant: SAFRAN CERAMICS, Le Haillan (FR)

(72) Inventors: Nicolas Eberling-Fux, Moissy-Cramayel (FR); Eddy Goullianne, Moissy-Cramayel (FR); William Ros, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 16/649,372

(22) PCT Filed: Sep. 19, 2018

(86) PCT No.: PCT/FR2018/052287
§ 371 (c)(1),
(2) Date: Mar. 20, 2020

(87) PCT Pub. No.: WO2019/058054
PCT Pub. Date: Mar. 28, 2019

(65) Prior Publication Data
US 2020/0269468 A1    Aug. 27, 2020

(30) Foreign Application Priority Data

Sep. 21, 2017  (FR) ...................... 1758744

(51) Int. Cl.
F01D 9/04      (2006.01)
F01D 5/24      (2006.01)
(Continued)

(52) U.S. Cl.
CPC .............. F01D 9/04 (2013.01); B28B 13/021 (2013.01); B28B 19/0092 (2013.01);
(Continued)

(58) Field of Classification Search
None
See application file for complete search history.

(56) References Cited

U.S. PATENT DOCUMENTS 4,568,594 A * 2/1986 Hordonneau ......... C04B 35/117
                                               427/376.1
5,489,408 A * 2/1996 Nakano ..................... B28B 3/02
                                               264/624
(Continued)

FOREIGN PATENT DOCUMENTS

CN        1686696 A    10/2005
CN      103507303 A     1/2014
(Continued)

OTHER PUBLICATIONS

Gao, Tianqi, et al. "Fabrication and Characterization of Three Dimensional Woven Carbon Fiber/Silica Ceramic Matrix Composites." Composites Part B: Engineering, vol. 77, 2015, pp. 122-128., doi:10.1016/j.compositesb.2015.02.024. (Year: 2015).*
(Continued)

Primary Examiner — Kelly M Gambetta
Assistant Examiner — Andrés E. Behrens, Jr.
(74) Attorney, Agent, or Firm — Pillsbury Winthrop Shaw Pittman LLP

(57) ABSTRACT

A method for manufacturing a part made of composite material includes injecting into a fibrous texture a slurry including at least one powder of refractory ceramic particles suspended in a liquid phase, filtering the liquid phase of the slurry and retaining the powder of refractory ceramic particles inside the texture so as to obtain a fibrous preform loaded with refractory ceramic particles, densifying the fibrous texture by treatment of the refractory ceramic particles present in the fibrous texture in order to form a refractory matrix in the texture. The method further includes, before injecting the slurry under pressure, pre-
(Continued)

saturating the fibrous texture with a carrier fluid consisting in injecting into said texture a carrier fluid.

9 Claims, 3 Drawing Sheets

(51) Int. Cl.
| | |
|---|---|
| B29C 70/48 | (2006.01) |
| C04B 35/80 | (2006.01) |
| C04B 35/14 | (2006.01) |
| C04B 35/18 | (2006.01) |
| C04B 35/185 | (2006.01) |
| C04B 35/447 | (2006.01) |
| C04B 35/488 | (2006.01) |
| C04B 35/56 | (2006.01) |
| C04B 35/563 | (2006.01) |
| C04B 35/565 | (2006.01) |
| C04B 35/573 | (2006.01) |
| C04B 35/58 | (2006.01) |
| C04B 35/584 | (2006.01) |
| C04B 35/591 | (2006.01) |
| F01D 5/28 | (2006.01) |
| B28B 19/00 | (2006.01) |
| B28B 23/00 | (2006.01) |
| B28B 13/02 | (2006.01) |
| F01D 25/24 | (2006.01) |
| F02K 1/82 | (2006.01) |
| C04B 35/117 | (2006.01) |
| F01D 5/00 | (2006.01) |
| B28B 13/00 | (2006.01) |
| F23R 3/00 | (2006.01) |

(52) U.S. Cl.
CPC .......... *B28B 23/0006* (2013.01); *B29C 70/48* (2013.01); *C04B 35/117* (2013.01); *C04B 35/14* (2013.01); *C04B 35/18* (2013.01); *C04B 35/185* (2013.01); *C04B 35/447* (2013.01); *C04B 35/488* (2013.01); *C04B 35/56* (2013.01); *C04B 35/563* (2013.01); *C04B 35/565* (2013.01); *C04B 35/5611* (2013.01); *C04B 35/573* (2013.01); *C04B 35/58* (2013.01); *C04B 35/584* (2013.01); *C04B 35/5805* (2013.01); *C04B 35/58071* (2013.01); *C04B 35/58092* (2013.01); *C04B 35/591* (2013.01); *C04B 35/80* (2013.01); *F01D 5/282* (2013.01); *F01D 5/284* (2013.01); *F01D 25/24* (2013.01); *F02K 1/82* (2013.01); *C04B 2235/3217* (2013.01); *C04B 2235/3418* (2013.01); *C04B 2235/3463* (2013.01); *C04B 2235/5244* (2013.01); *C04B 2235/5248* (2013.01); *C04B 2235/5256* (2013.01); *C04B 2235/616* (2013.01); *F05D 2300/6033* (2013.01); *F23R 3/007* (2013.01); *F23R 2900/00018* (2013.01)

(56) References Cited

U.S. PATENT DOCUMENTS

| | | | |
|---|---|---|---|
| 10,239,227 B2 * | 3/2019 | Caruel | ............... B32B 18/00 |
| 2013/0116109 A1 * | 5/2013 | Ritti | ............... C04B 35/803 |
| | | | 501/95.2 |

FOREIGN PATENT DOCUMENTS

| | | |
|---|---|---|
| CN | 103826819 A | 5/2014 |
| CN | 106029607 A | 10/2016 |
| EP | 2 560 932 B1 | 6/2017 |
| WO | WO 2011/131857 A1 | 10/2011 |
| WO | WO 2016/102837 A1 | 6/2016 |
| WO | WO 2016/102839 A1 | 6/2016 |
| WO | WO 2017/060601 A1 | 4/2017 |

OTHER PUBLICATIONS

International Search Report as issued in International Patent Application No. PCT/FR2018/052287, dated Dec. 20, 2018.
Nordlund, M., et al., "Particle deposition mechanisms during processing of advanced composite materials," Composites: Part A, vol. 38, (2007), pp. 2182-2193.
International Preliminary Report on Patentability and the Written Opinion of the International Searching Authority as issued in International Patent Application No. PCT/FR2018/052287, dated Mar. 24, 2020.
First Office Action as issued in Chinese Patent Application No. 2018800596622, dated Apr. 6, 2021.

* cited by examiner

METHOD FOR INJECTING A LOADED SLURRY INTO A FIBROUS TEXTURE

CROSS-REFERENCE TO RELATED APPLICATIONS

This application is the U.S. National Stage of PCT/FR2018/052287, filed Sep. 19, 2018, which in turn claims priority to French patent application number 1758744 filed Sep. 21, 2017. The content of these applications are incorporated herein by reference in their entireties.

BACKGROUND OF THE INVENTION

The present invention relates to a method for manufacturing a part made of thermostructural composite material, in particular of the Oxide/Oxide or ceramic matrix composite (CMC) type, that is to say including a fibrous reinforcement formed from fibers made of refractory ceramic material densified by a matrix also made of refractory ceramic material. The invention relates more particularly to the manufacture of parts made of Oxide/Oxide or CMC composite material by liquid process comprising a step of impregnating a fibrous reinforcement with a slurry loaded, for example with alumina particles in the case of an Oxide/Oxide composite material or with silicon carbide particles (SiC) in the case of a CMC composite material.

The impregnation step is carried out by pressure injection of a loaded slurry (generally between 10% and 40% by volume) within a fibrous reinforcement (STM for "Slurry Transfer Molding" process). The slurries used for the injection are lightly loaded in order in particular to have a stable viscosity for the transport of fillers in the volume of the fibrous reinforcement. In such a case, it is necessary to drain or filter the liquid phase of the slurry in order to obtain an optimal filling of the residual porosities present in the fibrous reinforcement with the solid fillers. Such a method is in particular described in document WO 2016/102839.

In the case of a SiC/SiC material, the steps of injecting and filtering the loaded slurry are carried out on fibrous blanks obtained by three-dimensional (3D) weaving and consolidated or pre-densified by chemical vapor infiltration (CVI). The incompressible blank with a fixed porosity network has an inter-yarn overall residual porosity comprised between 25% and 45% by volume. However, the 3D fibrous blanks or blanks formed of a stack of fibrous plies have a complex porosity network which causes difficulties in the monitoring of the filling of the fibrous blank by the loaded slurry. Thus, the steps of injecting or filtering the loaded suspension into the fibrous texture are not well controlled, which results in the presence of porosities in the final part.

FIG. 4 shows two microscopic photographs of a cross-section of a part 300 made of SiC/SiC composite material according to the prior art, namely here a SiC fiber reinforcement 310 formed here by 3D weaving between layers of weft yarns and warp yarns in an interlock weave and densified by a SiC matrix 320. The part 300 was manufactured in the same manner as described above, that is to say by injection of a slurry loaded with SiC particles from the slice(s) or the face(s) of a SiC fibrous texture, the injection having been carried out in conditions similar to those of the well-known injection molding process called "RTM" ("Resin Transfer Moulding"). As can be seen in FIG. 4, the part 300 includes inter-yarn porosities 330 corresponding to porosities initially present in the fibrous reinforcement that have not been filled with the SiC matrix.

In the case of an Oxide/Oxide material, the injection of the loaded slurry is carried out in a fibrous texture with a double porosity network, namely an intra-yarn porosity network and an inter-yarn porosity network. Here again, due to a complicated access to the entire porosity network in the fibrous texture, injection and filtration difficulties have been observed leading to the presence of porosities or areas of absence of matrix in the resulting material.

OBJECT AND SUMMARY OF THE INVENTION

The object of the present invention is to overcome the aforementioned drawbacks and to propose a solution which makes it possible to produce parts made of composite material, in particular of the Oxide/Oxide or CMC type, from a fibrous texture of complex and/or thick geometry, and this in a robust and repeatable manner by allowing good monitoring of the deposition and distribution of the solid particles in the fibrous texture in order to obtain a material with a very low residual porosity rate and therefore improved properties.

To this end, the invention proposes a method for manufacturing a part made of composite material comprising the following steps:

forming a fibrous texture from refractory ceramic fibers,
placing the fibrous texture in a mold cavity of an injection tooling,
injecting into the fibrous texture a slurry including at least one powder of refractory ceramic particles or particles of a refractory ceramic precursor suspended in a liquid phase,
filtering the liquid phase of the slurry and retaining the powder of refractory ceramic particles or particles of a refractory ceramic precursor inside said texture so as to obtain a fibrous preform loaded with refractory ceramic particles or particles of a refractory ceramic precursor,
densifying the fibrous texture by treatment of the refractory ceramic particles present in the fibrous texture in order to form a refractory matrix in said texture,
characterized in that, after the step of placing the fibrous texture in a mold cavity of an injection tooling and before the step of injecting the slurry under pressure, the method comprises a step of pre-saturating the fibrous texture with a carrier fluid consisting in injecting into said texture a carrier fluid.

By pre-saturating the fibrous texture with a carrier fluid before its injection with the loaded slurry, a transient regime for which the filler transfer mechanisms within the texture are well monitored is established. Consequently, this allows optimizing the filling of the texture with the refractory ceramic particles. The pre-saturation step allows overcoming the problems of wettability of the fibrous texture during the injection of the loaded slurry. The filling of the porosities present in the fibrous texture is facilitated from the start of the injection by dilution of the particles in the carrier fluid already present in the texture.

According to a particular characteristic of the method of the invention, the carrier fluid corresponds to the liquid phase of the slurry. This allows overcoming possible problems of wettability of the texture and possible destabilization of the particles suspended in the slurry.

According to another particular characteristic of the method of the invention, the carrier fluid pre-saturation step and the slurry injection step are continuously linked. The manufacturing time for the part is thus reduced while optimizing the effect of the transient regime created by the pre-saturation step.

According to another particular characteristic of the method of the invention, the pre-saturation step is stopped when the pressure in the mold cavity reaches a predetermined pressure value. It is thus possible to monitor and validate the pre-saturation step in order to inject the slurry at the optimal time.

According to another particular characteristic of the method of the invention, during the pre-saturation step, the carrier fluid is injected at a first determined flow rate and, during the loaded slurry injection step, said slurry is injected at a second determined flow rate similar to or different from the first flow rate.

According to another particular characteristic of the method of the invention, during the fibrous texture formation step, the yarns are woven in a three-dimensional or multilayer weaving.

The yarns of the texture can be yarns formed of fibers made of one or several of the following materials: the alumina, the mullite, the silica, an aluminosilicate, a borosilicate, silicon carbide and carbon.

The refractory ceramic particles can be made of a material chosen from: the alumina, the mullite, the silica, an aluminosilicate, an aluminophosphate, the zirconia, a carbide, a boride and a nitride.

In an exemplary embodiment, the part made of composite material obtained can constitute a turbomachine vane or even an afterbody part, a combustion chamber, a flap, a post-combustion arm, a turbine ring, a mixer, a distributor, etc.

BRIEF DESCRIPTION OF THE DRAWINGS

Other characteristics and advantages of the invention will emerge from the following description of particular embodiments of the invention, given by way of non-limiting examples, with reference to the appended drawings, in which.

DETAILED DESCRIPTION OF EMBODIMENTS

Figure 1:
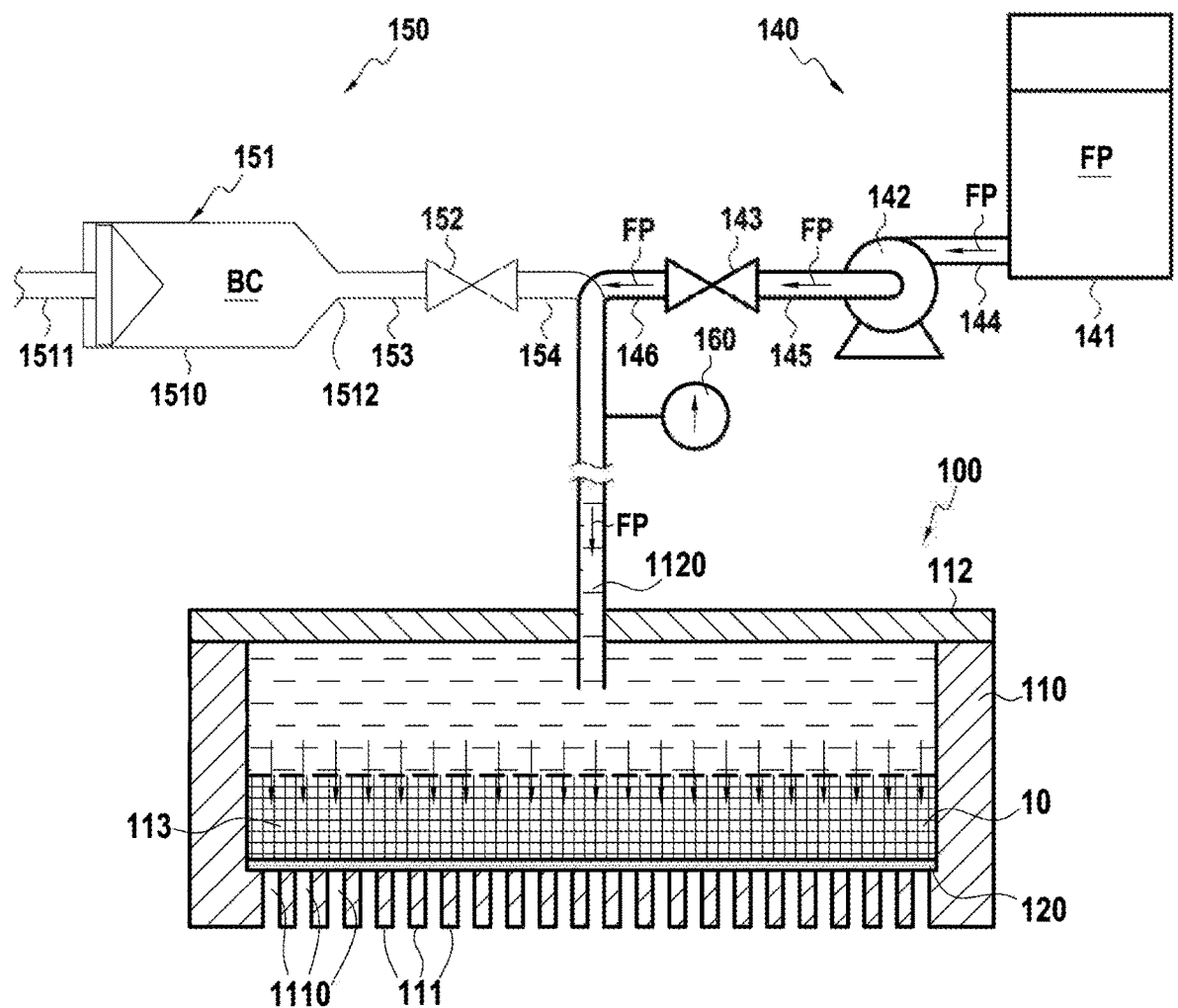
FIG. 1 is a schematic cross-sectional view showing a step of pre-saturating a fibrous texture with a carrier fluid according to one embodiment of the invention.

The method for manufacturing a part made of composite material in particular of the Oxide/Oxide or CMC type according to the present invention begins with the achievement of a fibrous texture 10 intended to form the reinforcement of the part.

The fibrous structure is achieved in a known manner by weaving by means of a Jacquard-type loom on which a bundle of warp yarns or strands has been disposed in a plurality of layers, the warp yarns being bonded by weft yarns or vice versa. The fibrous texture can be achieved by stacking of plies or folds obtained by two-dimensional weaving (2D) or unidirectional sheets (UD) of yarns or cables or multidirectional sheets (nD) obtained by superimposition of several sheets UD in different directions and bonding of the UD sheets together, for example by sewing, by chemical bonding agent or by needling.

The fibrous texture can also be achieved directly in a single piece by three-dimensional (3D) weaving. By "two-dimensional weaving" is meant here a conventional weaving mode by which each weft yarn passes from one side to the other of yarns of a single warp layer or vice versa. In the case of the injection of a loaded slurry in 2D fibrous textures, namely textures obtained by stacking of 2D plies or folds, the invention is particularly suitable for 2D textures of significant thickness, that is to say 2D fibrous textures having a thickness of at least 0.5 mm, preferably at least 1 mm.

By "three-dimensional weaving" or "3D weaving" or even "multilayer weaving", is meant here a weaving mode by which at least some of the weft yarns bind warp yarns on several layers of warp yarns or vice versa in a weaving corresponding to a weave which can be in particular chosen from one of the following weaves: interlock, multi-canvas, multi-satin and multi-twill.

By "interlock weave or fabric", is meant here a 3D-weave, whose each layer of warp yarns binds several layers of weft yarns with all the yarns of the same warp column having the same movement in the plane of the weave.

By "multi-canvas weave or fabric", is meant here a 3D-weaving with several layers of weft yarns, whose basic weave of each layer is equivalent to a weave of the conventional canvas type but with some points of the weave that bind the layers of weft yarn together.

By "multi-satin weave or fabric", is meant here a 3D-weaving with several layers of weft yarns, whose basic weave of each layer is equivalent to a weave of the conventional satin type but with some points of the weave that bind the layers of weft yarns together.

By "multi-twill weave or fabric", is meant here a 3D-weaving with several layers of weft yarns whose basic weave of each layer is equivalent to a weave of the conventional twill type but with some points of the weave that bind the layers of weft yarns together.

The 3D textures, or textures formed by stacking of 2D plies or UD sheets, have a complex geometry in which it is difficult to introduce and evenly distribute suspended solid particles. The method of the invention is very well adapted for the introduction of a loaded slurry in 3D woven fibrous textures.

The yarns used to weave the fibrous texture intended to form the fibrous reinforcement of the part made of composite material can be in particular formed of fibers made of one of the following materials: the alumina, the mullite, the silica, an aluminosilicate, a borosilicate, silicon carbide, carbon or a mixture of several of these materials.

In the example described here, the fibrous texture 10 is achieved by 3D-weaving between a plurality of yarns of SiC fibers, the texture being consolidated after weaving by a chemical vapor infiltration of SiC. The fibrous texture 10 is here intended to form the fibrous reinforcement of a part made of SiC/SiC composite material (SiC fiber reinforcement densified by a SiC matrix).

FIG. 1 illustrates an injection tooling 100 according to the invention and which comprises an enclosure 110 and a bottom 111 forming together a mold cavity 113. A filter 120 is present on the bottom 111 of the enclosure 110, the bottom 111 including openings 1110. The upper portion of the enclosure 110 is closed by a cover 112 including an injection port 1120 connected on the one hand to a carrier fluid injection system 140 and, on the other hand, to a loaded slurry injection system 150, without however departing from the scope of the invention when the carrier fluid and the loaded slurry are injected through a plurality of injection ports opening into the mold cavity 113.

More specifically, the carrier fluid injection system here consists of a reservoir 141 containing a carrier fluid FP and whose outlet duct 144 is connected to the inlet of a peristaltic pump 142. The outlet of the peristaltic pump 142 is connected to the injection port 1120 by ducts 145 and 146 between which a valve 143 is interposed. The loaded slurry injection system 150 here consists of an injection pot 151 which delimits a chamber 1510 containing a loaded slurry BC, the injection pot 151 being further equipped with a piston 1511 and, opposite said piston, a discharge opening 1512 connected to the injection port 1120 by ducts 153 and 154 between which a valve 152 is interposed.

Once the fibrous texture 10 is achieved, it is placed in the injection tooling 100 which allows, as explained below, depositing refractory ceramic particles or particles of a refractory ceramic precursor within the fibrous texture.

FIG. 1 illustrates the step of pre-saturating the fibrous texture 10 with the carrier fluid FP according to the invention. The carrier fluid FP can be chosen in particular from the following fluids: water having different pH, alcohol (e.g. ethanol, PVA), esters (e.g. ethyl acetate), ketones (e.g. acetone, methyl ethyl ketone), alkanes (e.g. hexadecane), alkenes (e.g. toluene), THF, polyvinyl alcohol (PVA), polyvidone (PVP). The carrier fluid is preferably of the same nature as the liquid phase present in the loaded slurry BC. In the example described here, the carrier fluid FP corresponds to water at a pH comprised between 9 and 10. During this step, the loaded slurry injection system 150 is inoperative, the injection pot 151 not delivering slurry BC and the valve 152 being closed. On the side of the carrier fluid injection system, the carrier fluid FP is delivered at a constant flow rate into the injection port 1120 by the peristaltic pump 142, the valve 143 being open. The carrier fluid is injected at a flow rate comprised between 2 cm$^3$/min and 1500 cm$^3$/min. In the example described here, the carrier fluid consisting of water is delivered at a flow rate of 100 cm$^3$/min. The regulation of the flow rate of the injected carrier fluid can be carried out with other means than a peristaltic pump, for example with an injector equipped with a piston having a monitored flow rate. The peristaltic pump is controlled to monitor the flow rate of the carrier fluid FP injected in the mold cavity 113 at least at a determined flow rate value.

The pre-saturation step ends when the carrier fluid saturation in the fibrous texture is considered complete, that is to say when the pressure in the mold cavity 113 (pressure loss of the carrier fluid injection system) reaches a stability threshold, for example 600 millibars. The measurement of the achievement of the pressure stability threshold at the end of the pre-saturation step can be carried out by means of a pressure sensor 160, for example a pressure gauge, placed at the injection port 1120 of the injection tooling 100. The measurement of the pressure in the mold cavity can also be carried out with pressure sensors placed on the surface of the mold cavity (not represented in FIGS. 1 and 2).

Figure 2:
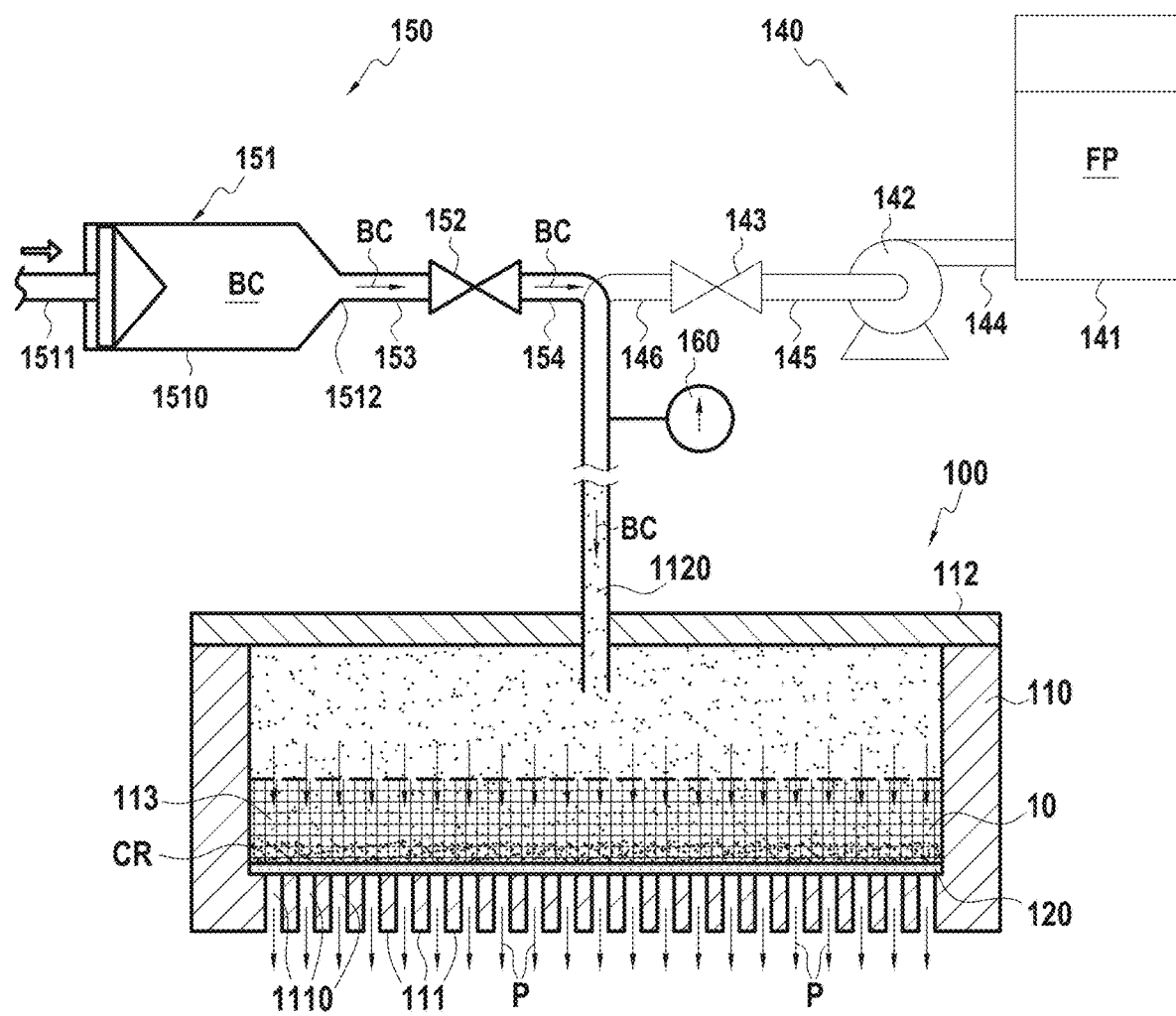
FIG. 2 is a schematic cross-sectional view showing steps of injecting a loaded slurry and draining the liquid phase of the slurry into the fibrous texture of FIG. 1.

Once the pre-saturation step is completed, the step of injecting the loaded slurry BC into the fibrous texture 10 is carried out as illustrated in FIG. 2. In the example described here, the slurry BC comprises 20% by volume of SiC particles having an average diameter D50 comprised between 0.5 µm and 0.9 µm suspended in water at a pH comprised between 9 and 10. The particles can also have a micron (>10 µm) or submicron size.

During this step, the loaded slurry BC is injected into the mold cavity 113 under a monitored pressure or flow rate. During this step, the carrier fluid injection system 140 is inoperative, the peristaltic pump 142 being stopped and the valve 143 being closed. On the side of the loaded slurry injection system 150, the slurry BC is delivered at a regulated flow rate into the injection port 1120 by the injection pot 151, the valve 152 being open, the slurry BC being here injected at a minimum flow rate of 2 cm$^3$/min. The regulation of the flow rate is controlled by the piston 1511 of the injection pot 151 so as to deliver the loaded slurry at a flow rate lower than the carrier fluid injection flow rate. In FIG. 2, the slurry BC is injected under pressure through the injection port 1120.

As illustrated in FIG. 2, the refractory ceramic particles CR present in the slurry BC, here SiC particles, are retained in the fibrous texture 10 thanks to the filter 120. The filter 120 is calibrated to retain the refractory oxide particles present in the slurry while the liquid from the latter is discharged through the openings 1110. The refractory oxide particles are thus gradually deposited by sedimentation in the texture. The filter 120 can for example consist of a part made of porous material for example microporous polytetrafluoroethylene (PTFE) like the "microporous PTFE" products sold by the company Porex®. For example, in order to produce the part of porous material, it is possible to use the PM material 0130 marketed by the company Porex® having a pore size comprised between 1 µm and 2 µm, the PM material 0510 from the company Porex®, or the Bekipor® material. In general, any device, such as a metal grid or a ceramic filter, able to retain the injected particles can be used for the filtration step. In combination with the injection of the loaded slurry BC, a pumping P, for example by means of a primary vacuum pump (not represented in FIG. 2), can be carried out on the outer side of the bottom 111 of the enclosure 110 through openings 1110 so as to improve the migration of the slurry through the fibrous texture 10 and the filtration of its liquid phase.

Once the injection and filtration steps have been carried out, a fibrous preform loaded with refractory ceramic particles, in this case SiC particles, is obtained. The obtained preform is then dried and demolded, the preform being able to retain after demolding the form adopted in the mold cavity.

The preform is then densified by a treatment of the particles present in the preform. In the case of oxide particles for example, the treatment consists in subjecting the particles to a sintering heat treatment, for example under air at a temperature comprised between 1000° C. and 1200° C. in order to sinter the particles and thus form a refractory ceramic matrix in the porosity of the fibrous preform. In the case of SiC particles, as in the example described here, the SiC particles are impregnated with silicon by infiltration of the preform with melt silicon (MI "Melt Infiltration" process) so as to form a SiC matrix. This gives a part made of composite material, here SiC/SiC composite material, provided with a fibrous reinforcement formed by the fibrous preform and having a high matrix volume ratio with a homogeneous distribution of the refractory ceramic matrix throughout the fibrous reinforcement.

Figure 3:
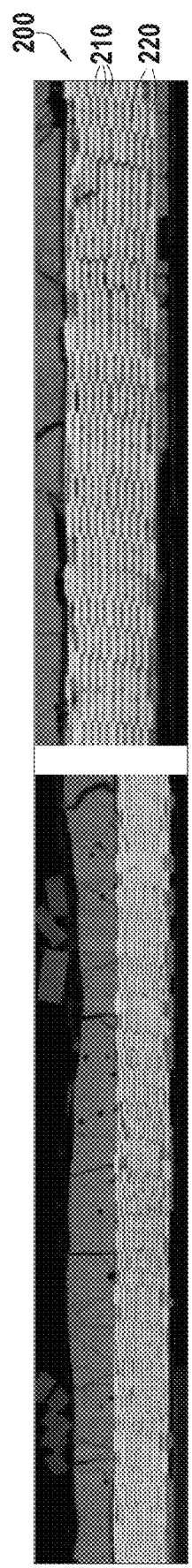
FIG. 3 presents two microscopic photographs of a part made of SiC/SiC composite material manufactured according to a method of the invention.
Figure 4:
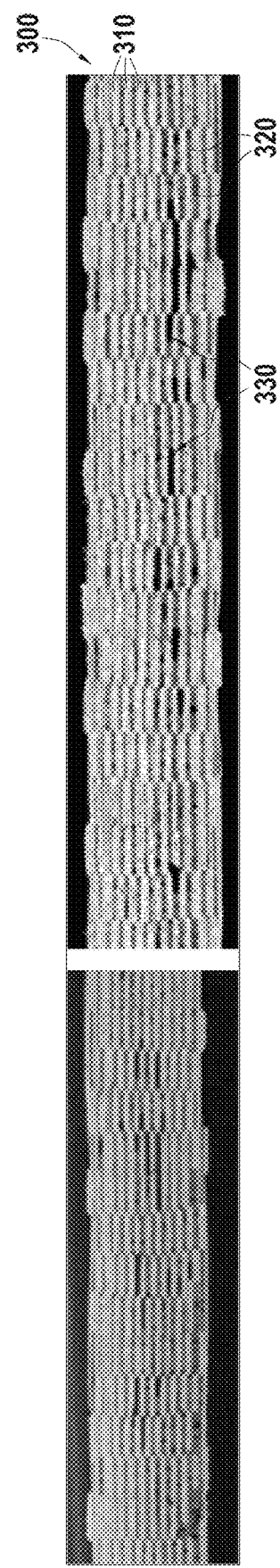
FIG. 4 presents two microscopic photographs of a part made of SiC/SiC composite material manufactured according to the prior art.

FIG. 3 shows two microscopic photographs of a cross-section (cross-section in the weft direction: the length of the photograph corresponding to the weft direction) of a part 200 made of SiC/SiC composite material manufactured according to a method of the invention comprising:

achieving a fibrous texture in SiC fibers formed here by 3D-weaving between layers of weft yarns and warp yarns in an interlock weave;

pre-densifying or consolidating the fibrous texture by chemical vapor infiltration of SiC;

placing the consolidated fibrous texture in an injection tooling similar to the tooling 100 described above;

pre-saturating the fibrous texture with a carrier fluid consisting of injecting into the texture water having a pH comprised between 9 and 10 at a flow rate of 100 cm$^3$/min;

injecting a loaded slurry into the fibrous texture at a flow rate of 2 cm$^3$/min, the slurry consisting of particles of SiC suspended in water having a pH comprised between 9 and 10;

filtering the liquid phase of the slurry so as to locally allow the accumulation of fillers in the texture and, consequently, to increase the filler ratio in the latter;

densifying the preform by infiltration with melt silicon to form a SiC matrix.

In FIG. 3, the resulting part 200 includes a fibrous reinforcement 210 formed of SiC yarns and densified by a SiC matrix 220. As can be seen in FIG. 3, the part 200 includes little or no visible inter-yarn porosity, which demonstrates the effectiveness of the fibrous texture pre-saturation step in the optimization of the filling of the texture during the subsequent injection of the loaded slurry.

The method of the invention is not limited to the injection of a slurry comprising SiC particles suspended in water. More generally, the slurries used can be a suspension including refractory ceramic particles having an average particle size comprised between 0.1 μm and 10 μm. The volume content of refractory ceramic particles in the slurry can, before injection, be comprised between 1% and 50%, preferably between 20% and 35% by volume. The refractory ceramic particles may include a material chosen from: the alumina, the mullite, the silica, the aluminosilicates, the aluminophosphates, the carbides, the borides, the nitrides and mixtures of such materials. Depending on their basic composition, the refractory ceramic particles can, in addition, be mixed with particles of alumina, zirconia, aluminosilicate, a rare-earth oxide, rare-earth silicate (which can for example be used in environmental or thermal barriers) or any other filler making it possible to make functional the composite material part to be obtained, such as carbon black, graphite or silicon carbide.

The liquid medium or phase of the slurries can, for example, also include an aqueous phase having an acidic pH (i.e. a pH less than 7) and/or an alcoholic phase including for example ethanol. The slurry may include an acidifier such as nitric acid and the pH of the liquid medium may for example be comprised between 1.5 and 4. The slurry may, in addition, include an organic binder such as polyvinyl alcohol (PVA) which is in particular soluble into water. More generally, the slurry may comprise:

a carrier fluid,
a dispersant (e.g. suitable pH),
a binder (e.g. PVA),
a plasticizer (e.g. PVA),
an anti-foaming agent,
a wetting agent.

A part made of CMC composite material other than Oxide/Oxide material can be obtained in the same way by achieving the fibrous texture with fibers of silicon carbide and/or carbon and by using a slurry loaded with carbide particles (for example SiC, B$_4$C or TiC), boride (for example TiB$_2$), nitride (for example Si$_3$N$_4$), or silicide (for example TiSi$_2$).

The invention claimed is:

1. A method for manufacturing a part made of composite material comprising the following steps:
    forming a fibrous texture from refractory ceramic fibers,
    placing the fibrous texture in a mold cavity of an injection tooling,
    injecting under pressure and into the fibrous texture, placed in the mold cavity, a slurry including at least one powder of refractory ceramic particles or particles of a refractory ceramic precursor suspended in a liquid phase,
    filtering the liquid phase of the slurry using a filter of porous material provided with the mold cavity and retaining the powder of refractory ceramic particles or particles of a refractory ceramic precursor inside said fibrous texture so as to obtain a fibrous preform loaded with refractory ceramic particles or particles of a refractory ceramic precursor,
    densifying the fibrous texture by treatment of the refractory ceramic particles present in the fibrous texture in order to form a refractory matrix in said texture,
    wherein, after the step of placing the fibrous texture in the mold cavity of the injection tooling and before the step of injecting the slurry under pressure, the method comprises a step of pre-saturating the fibrous texture with a carrier fluid consisting of a liquid, the pre-saturating step consisting of injecting said carrier fluid into said fibrous texture while placed inside the mold cavity, said carrier fluid being filtered with said liquid phase of the slurry during the filtering, and wherein the injection tool comprises means for regulating a flow rate such that the step of pre-saturating the fibrous texture inside the mold cavity comprises regulating the flow rate of the injection of the carrier fluid.

2. The method according to claim 1, wherein the carrier fluid corresponds to the liquid phase of the slurry.

3. The method according to claim 1, wherein the carrier fluid pre-saturation step and the slurry injection step are performed continuously.

4. The method according to claim 1, wherein the pre-saturation step is stopped when pressure in the mold cavity reaches a predetermined pressure value.

5. The method according to claim 1, wherein, during the pre-saturation step, the carrier fluid is injected at a first determined flow rate and wherein, during the slurry injection step, said slurry is injected at a second determined flow rate similar to or different from the first flow rate.

6. The method according to claim 1, wherein, during the fibrous texture formation step, yarns are woven in a three-dimensional or multilayer weaving.

7. The method according to claim 1, wherein yarns of the fibrous texture are formed of fibers made of one or several of the following materials: alumina, mullite, silica, an aluminosilicate, a borosilicate, silicon carbide and carbon.

8. The method according to claim 1, wherein the refractory ceramic particles are made of a material chosen from: alumina, mullite, silica, an aluminosilicate, an aluminophosphate, zirconia, a carbide, a boride and a nitride.

9. The method according to claim 1, wherein the part made of composite material obtained constitutes a turbomachine vane, an after-body part, a combustion chamber, a flap, a post-combustion arm, a turbine ring, a mixer or a distributor.

\* \* \* \* \*